July 2, 1940. F. B. EMBURY 2,206,560
LANTERN
Filed Jan. 5, 1938 2 Sheets-Sheet 1

INVENTOR.
Frederick B. Embury
BY Cumpston + Shepard
his ATTORNEYS

July 2, 1940.  F. B. EMBURY  2,206,560
LANTERN
Filed Jan. 5, 1938    2 Sheets-Sheet 2
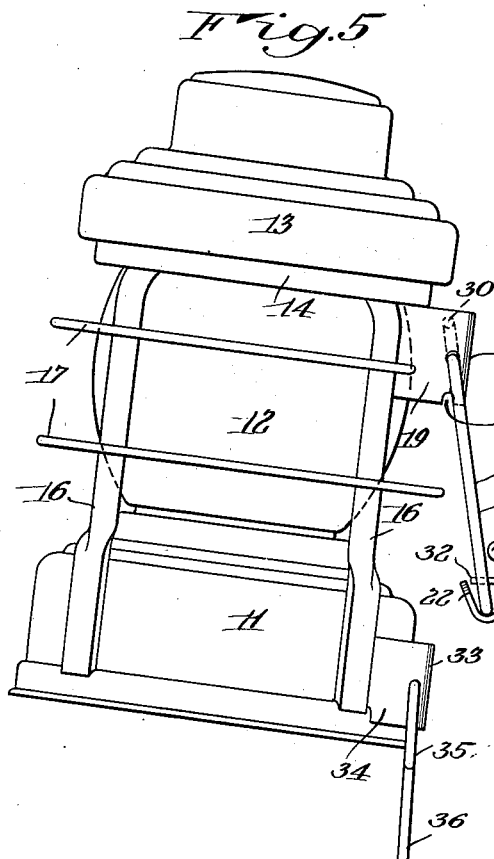
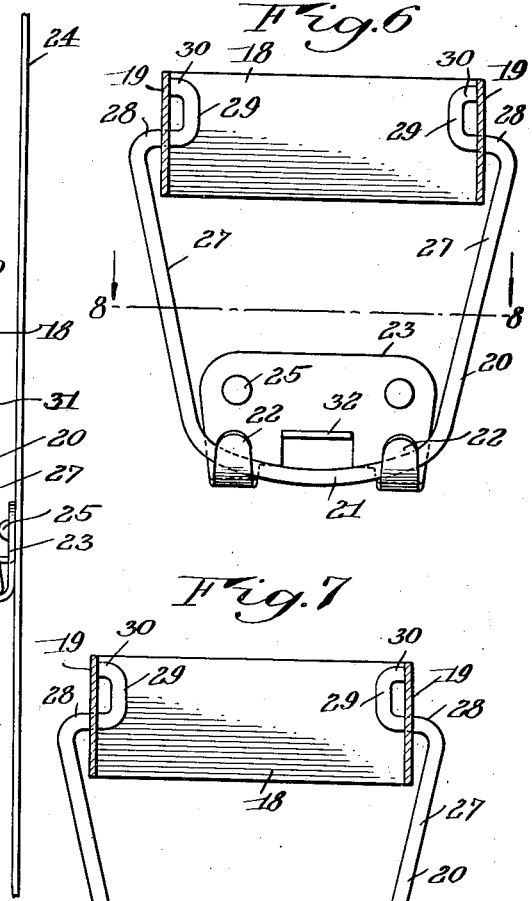
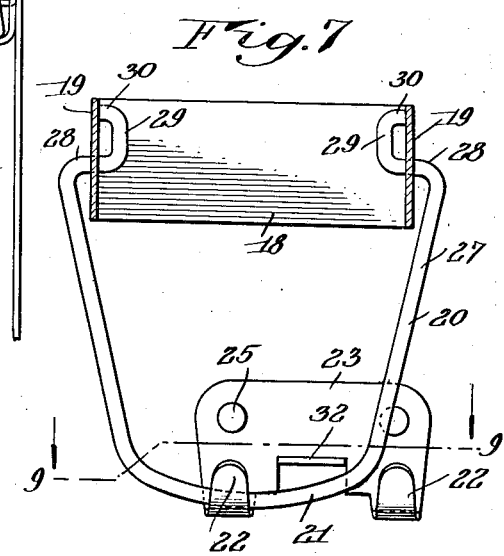
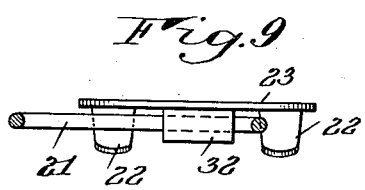
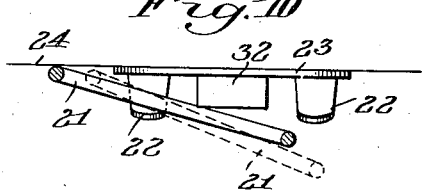
INVENTOR.
Frederick B. Embury
BY Cumpston + Shepard
his ATTORNEYS Patented July 2, 1940

2,206,560

UNITED STATES PATENT OFFICE 2,206,560

LANTERN

Frederick B. Embury, Warsaw, N. Y., assignor to Embury Manufacturing Company, Warsaw, N. Y., a corporation of New York Application January 5, 1938, Serial No. 183,512

5 Claims. (Cl. 240—57.1)

The present invention relates to lanterns and the like which are intended for use as warning and protecting signals for motor trucks and other types of vehicles, and has for its object to provide in combination with the lantern, improved means for attaching it to the vehicles, which means is of such a nature as to prevent persons not having advance knowledge of its construction and method of operation from effecting removal of the lanterns from the vehicles.

A further object of the invention is to provide improved supporting means for lanterns of the class described, embodying relatively movable parts for connecting the same with a vehicle or a stationary frame or support, and in which arrangement preconditioning of certain of the parts and subsequent movement of the lantern successively to different predetermined positions is required, in order to effect its removal from the vehicle or the support, the arrangement being such that the manner of conditioning said parts and the required movements of the lantern are not readily apparent when the lantern is in position upon the support.

A further object of the invention is to provide improved supporting means for lanterns of the class described, which means includes a handle for carrying the lantern and for connecting it with a suitable support, and which is provided with means operating automatically to lock the handle in a predetermined position relative to the lantern when it is moved to said position.

To these and other ends the invention resides in certain improvements and combinations of parts, all as will be hereinafter more fully described, the novel features being pointed out in the claims at the end of the specification.

In the drawings:

Fig. 5 is a side view of the lantern showing the supporting bail therefor at unlocked position and the lantern raised to a predetermined position, preparatory to removing the bail from a supporting bracket therefor;

Fig. 6 is a part sectional elevation showing the bail for supporting the lantern in the position indicated in Fig. 5;

Fig. 7 is a view similar to Fig. 6 with the bail moved to clear one of the lugs of the supporting bracket;

Fig. 8 is a horizontal section on line 8—8 of Fig. 6;

Fig. 9 is a horizontal section on line 9—9 of Fig. 7, and

Fig. 10 is a view similar to Fig. 9 showing full and dotted line positions of the bail to more clearly indicate the method of removing it from the supporting bracket.

The same reference numerals throughout the several views indicate the same parts.

Figure 1:
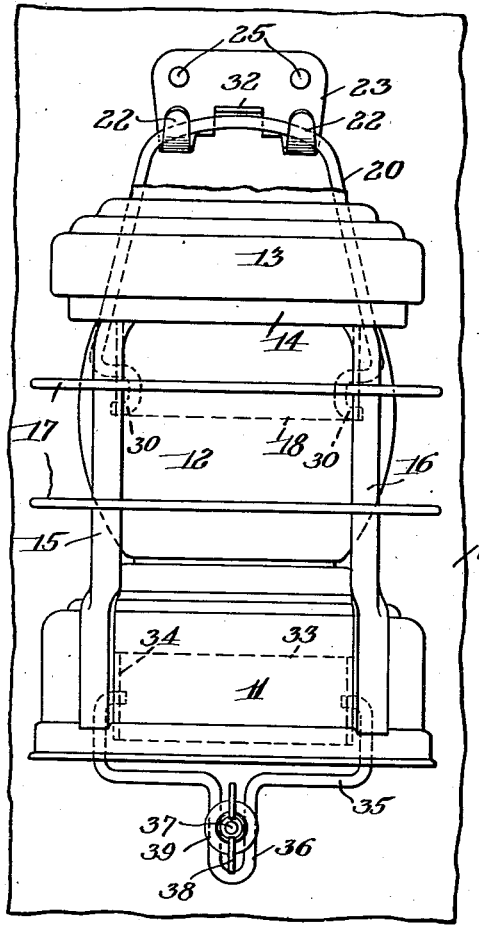
Fig. 1 is a front elevation of a lantern and supporting means therefor, embodying one form of the invention.

The present invention relates to lanterns and the like and more particularly to those of the class designed to be used in warning and protecting traffic and which are adapted for attachment to stationary supports and to vehicles of various kinds such, for example, as motor vehicles, including trucks and trailers, as well as railroad cars and other mobile objects. However the lantern of the present invention is particularly adapted for use on motor trucks, in addition to the corresponding electrically illuminated danger indicating lamps thereon, and will serve to take the place of the latter in case of failure of the same or of the electric lighting systems of which they form a part, thus complying with the regulations of certain states and municipalities which require the use of lanterns of this class, in view of such a contingency.

The novelty of the present invention, however, resides in combining with the lantern improved means for attaching it to or securing it upon a fixed or stationary support, or a motor truck or other conveyance, and particularly in a manner to prevent the lantern from being stolen or removed for other reasons by unauthorized persons.

Referring to the drawings, 10 designates generally a lantern of any preferred construction which in the present disclosure includes a base 11 in the form of a fuel holding receptacle, on which is supported a globe or chimney 12 having a dome or hood 13 overlying the same, the lantern being also provided with a burner and operating means therefor, not shown. The dome 13 is mounted for a swinging movement upon a ring 14 by suitable hinge means, not shown. The ring 14 is suitably connected with the upper ends of a pair of front posts 15 and a pair of rear posts 16, only one of which is shown. The lower ends of the posts are suitably connected with the base or fuel holding receptacle 11 as, for example, by spot welding. Horizontal guard rings 17 are suitably connected with the posts 15 and 16 and cooperate therewith to protect the globe.

At the rear side of the lantern and near the top thereof is provided a suitable supporting member 18 which is preferably in the form of a yoke or U-shaped bracket, the arms or side portions 19 of which are suitably connected with the two rear lantern posts 16 by spot welding, or otherwise as desired.

Figure 2:
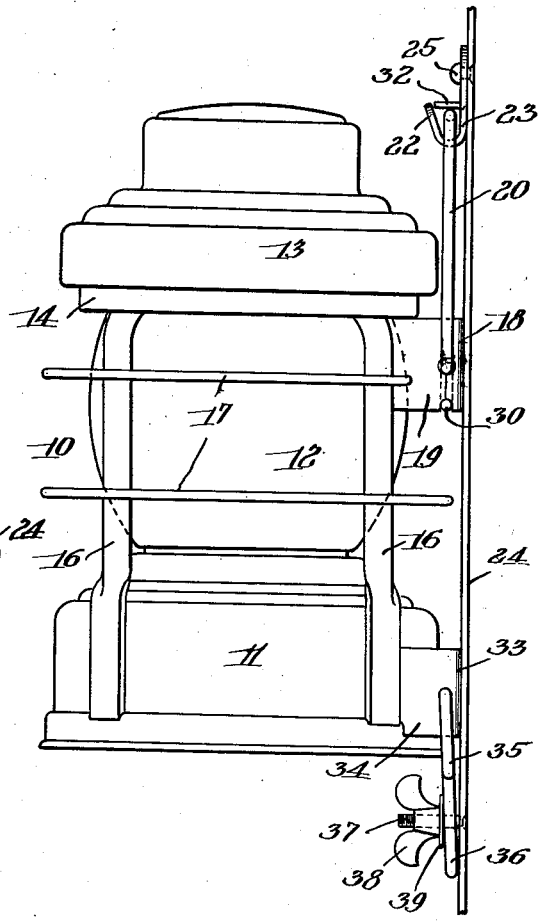
Fig. 2 is a side elevation of the same.
Figure 3:
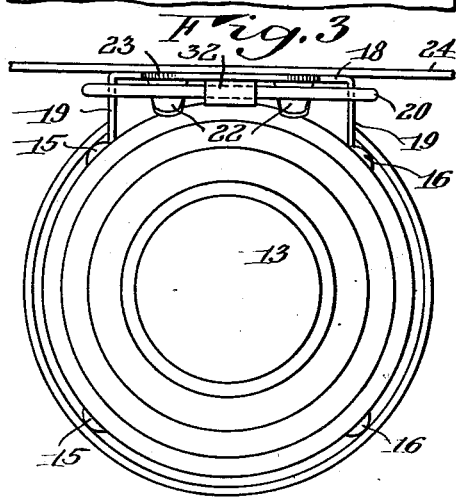
Fig. 3 is a top plan view of the lantern.

A bail 20 or other suitable supporting means, formed of resilient material, is pivotally connected with the bracket 18, the transverse end portion 21 of the bail being curved as shown in Fig. 6 for engagement with the upwardly bent lugs 22 of a fixed bracket or member 23 constituting a hook upon which to hang the lantern as shown in Fig. 2. The bracket is fixed upon a suitable support 24 which may constitute the tail board or a portion of the frame or body of a truck or other motor vehicle upon which it may be desired to secure the lantern. The bracket may be connected with the support 24 by any suitable means such as the rivets 25 extending through the holes 26 of the bracket, Figs. 2 and 4.

The arms or side portions 27 of the bail are provided with inwardly bent portions 28 extending through openings in the side portions 19 of the supporting bracket 18 to permit the bail to swing to different positions relative to the bracket. The portions 28 of the bail are provided with substantially right angle extensions 29, the ends of which are bent outwardly to provide locking portions 30 for the bail, which normally lie within the holes or notches 31 formed in the sides of the bracket 18, in which they are retained by the pressure resulting from the tendency of the side portions of the bail to move outwardly under the tension to which they are subjected by the spring-like action of the bail.

It will be understood that in order to move the side portions 27 of the bail from locking position, as shown in Fig. 2, it is necessary to grip and move the same inwardly, or each in the direction of the other, to withdraw the ends 30 thereof from the notches 31, after which the bail is free to swing upon and relative to the bracket to permit the lantern to be moved to different positions relative to the support 24, as described hereinafter.

Figure 4:
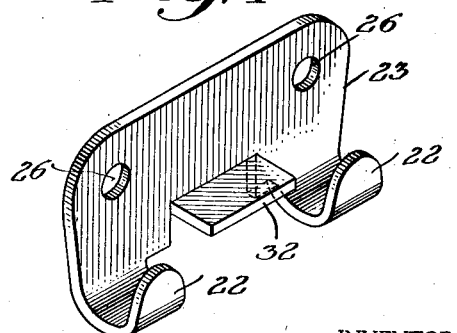
Fig. 4 is a perspective view of a bracket for supporting the lantern.

In order to make it more or less difficult to effect removal of the lantern from the support 24 the bracket 23 is provided with an outwardly struck lug 32 lying between the lugs 22 of the bracket, as shown in Figs. 4 and 6 whereby withdrawal of the bail from the bracket makes it necessary to move it to certain predetermined positions relative thereto, as described hereinafter.

At the bottom and rear side of the lantern is disposed a substantially U-shaped member 33, the side portions 34 of which are suitably connected with the base 11 or the lower ends of the rear posts 16 of the lantern in any suitable manner. A securing bail or holding member 35 has the extremities of its opposite side portions bent inwardly and extended through the side portions 34 of the U-shaped member to permit the bail to be swung to different positions relative to the lantern for a purpose which will appear hereinafter. The transverse portion of the bail has formed thereon a U-shaped extension 36 through which is extended a bolt or screw 37, the rear end of which is suitably connected with the support 24. The bolt is threaded to receive a wing nut 38 which is in engagement with a washer 39 disposed on the extension 36, whereby upon tightening the nut the bail will be clamped upon the support to hold the lantern against movement relative thereto.

In attaching the lantern to the support it is necessary to first grip the sides of the bail 20 and to swing them inwardly to withdraw the end portions 30 thereof from the notches 31 of the bracket 18. The bail can then be swung downwardly to the position shown, for example, in Fig. 5. By holding the lantern with one hand and positioning it in front of the support 24, the end portion 21 of the bail can be inserted between one of the lugs 22 and the guard 32 to the dotted line position shown in Fig. 10, after which the lantern will be moved to shift the bail to the full line position shown in said figure and then moved to swing the end portion 21 of the bail substantially into parallel relation to the body of the bracket 23, as shown, for example, in Figs. 7 and 9. When this has been done the lantern will again be moved to shift the bail from the position shown in Figs. 7 and 9 to that shown in Figs. 6 and 8. The next step is to move the lantern downwardly from the position shown in Fig. 5 to that shown in Fig. 2, at which time the end portions 30 of the bail 20 will move into registry with the holes or notches 31 of the bracket 18 and be snapped therein by the tension of the bail or spring-like action thereof.

The lower bail 35 will then be moved into position to receive the bolt 37 at which time the bail will be clamped upon the support 24 by tightening the wing nut 38. By thus attaching the lantern to the support it will be securely held thereon and prevented from moving relative thereto.

Instead of employing the bolt 37 and nut 38 to secure the lower bail on the support 24, a staple and padlock, not shown, may be used in which case the staple will be suitably connected with the support 24 and will project through the U-shaped extension 36 of the bail to receive the padlock.

When the curved end 21 of the bail 20 is in position upon the supporting lugs 22 of the bracket 23, it cannot be removed from the bracket as long as the bail remains in normal upright position, as shown in Fig. 2, for the reason that the guard 32 will prevent raising of the bail high enough to clear the lugs. Furthermore, it cannot be disengaged by swinging the lantern outwardly and upwardly because the hood or drum 13 will strike the fixed support 24 at a point above the bracket, thus preventing disengagement of the bail from the lugs 22. However, if while the lantern is hung in the normal position shown in Figs. 1 and 2, the side portions 27 of the bail are pressed toward each other to withdraw the locking extremities 30 from the holes or notches 31 of the bracket 18, the lantern as a whole can then be swung forwardly and upwardly to cause the bail to swing downwardly and rearwardly with respect to the lantern, or, in other words, to the position shown in Fig. 5. With the bail in this substantially upside down position it can be detached from the bracket 23 by shifting the lantern to move the bail from the position shown in Fig. 6 to that shown in Figs. 7 and 9 and then moving the lantern to shift the bail to the position shown in Fig. 10, at which the bail can be lifted from between the left hand lug 22 and the guard lug 32 to free the lantern for removal from the bracket.

It will be understood that while the lugs or hooks 22 normally serve to support the bail or hanger 20 in depending relation relative thereto, the lug 32 also serves to support the bail against upward movement and therefore against being raised high enough to clear the hooks when the hanger is in locked position on the bracket 18, as shown in Fig. 2. Furthermore the bail or hanger may be said to be connected both with the parts 22 and 32 and that one of which as, for example, the part 32 requires shifting of the lantern to move the hanger to a predetermined position and subsequent movement of the lantern and the hanger in different directions to effect removal of the same from said parts.

While the method of constructing and arranging the lantern supporting parts shown and described herein is particularly adapted for the purpose of attaching lanterns and the like to motor trucks and other types of vehicles, it will be understood that the same may be used for supporting other objects, in cases where it may be desired to connect them with a frame or support in a manner to prevent removal of the same by unauthorized persons.

While one embodiment of the invention has been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. The combination of a lantern, a handle for the lantern connected therewith to swing thereon, a support at one side of the lantern including a bracket having spaced portions below the top of the bracket and on which the handle is normally disposed in depending relation, and a portion forming a guard for the handle and positioned slightly above and between said spaced portions whereby movement of the lantern from normal position outwardly and upwardly to a predetermined position relative to the support causes the handle to swing to a substantially upside down position, said movement of the lantern being interrupted at said predetermined position by contact with the support, and permits detachment of the lantern from the support only by moving it in one direction to move the handle to a predetermined position and subsequently moving it in another direction to move the handle to a different predetermined position for withdrawal from said parts.

2. The combination of a lantern, a bail connected with the lantern to swing thereon, spring latch means for holding said bail in a predetermined fixed position with respect to said lantern, a support at one side of the lantern having laterally spaced portions positioned below the top of the support and on which the bail is normally disposed in depending relation while it is in said fixed position with respect to said lantern, a part forming a guard for the bail and positioned slightly above and between said two spaced portions, to prevent removal of said bail from said spaced portions except when said bail is swung upwardly to a substantially inverted position, movement of said bail upwardly toward said inverted position being interrupted by contact of said lantern with said support so long as said bail remains in said fixed position with respect to said lantern, said bail being capable of release from said spaced portions only upon release of said spring latch means and movement of said bail away from said predetermined fixed position to a different position with respect to said lantern.

3. The combination of a lantern, a hanger for the lantern connected therewith, supporting means for the hanger, means in connection with said supporting means for preventing removal of the hanger from the supporting means when the hanger is in a depending position with respect to the supporting means, and means including releasable locking elements between the hanger and the lantern for preventing movement of the hanger from its depending position to a position such that the hanger may be released from the supporting means.

4. The combination of a lantern having a hanger pivoted thereto and a support, said support having a part which prevents raising of the hanger to thereby prevent removal of the hanger and the lantern from the support, means for locking the hanger and the lantern with respect to each other, and means for releasing said locking means to enable pivotal movement of the hanger and the lantern with respect to each other, said hanger and lantern upon release of said locking means being removable from the support upon an upward swinging movement of the hanger.

5. In a structure of the character described wherein a lantern is hung from an approximately vertical support, a hanger pivotally connected to the lantern, a bracket secured to the support for carrying the hanger, means in connection with the bracket for preventing removal of the hanger from the bracket except when the hanger is in a predetermined position with respect to the bracket, releasable latch means between the hanger and the lantern for preventing pivotal movement of the hanger and the lantern relative to each other, said lantern when swung with the hanger as a unit engaging the support to prevent the hanger from being swung to said predetermined position and said latch means upon release enabling the hanger and lantern to be swung relative to each other so that the hanger may be swung to said predetermined position.

FREDERICK B. EMBURY.